(12) United States Patent
Kumar et al.

(10) Patent No.: US 9,572,057 B2
(45) Date of Patent: Feb. 14, 2017

(54) TRAFFIC SCHEDULING SYSTEM FOR WIRELESS COMMUNICATION SYSTEM

(71) Applicants: Anoop Kumar, Noida (IN); Amit Purohit, Noida (IN)

(72) Inventors: Anoop Kumar, Noida (IN); Amit Purohit, Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 178 days.

(21) Appl. No.: 14/692,725

(22) Filed: Apr. 21, 2015

(65) Prior Publication Data

US 2016/0316485 A1 Oct. 27, 2016

(51) Int. Cl.
*H04W 24/08* (2009.01)

(52) U.S. Cl.
CPC .................................. *H04W 24/08* (2013.01)

(58) Field of Classification Search
CPC ...... H04L 12/26; H04L 12/2602; H04L 43/04; H04L 43/06; H04L 43/062; H04L 43/065; H04L 43/50; H04W 24/08; H04W 72/04; H04W 72/0413; H04W 72/042; H04W 72/085; H04W 72/1231; H04W 72/1278; H04W 72/1284; H04W 72/1289
See application file for complete search history.

(56) References Cited

U.S. PATENT DOCUMENTS

| | | | |
|---|---|---|---|
| 6,687,226 B1 | 2/2004 | Galyas | |
| 6,944,798 B2 | 9/2005 | Stephenson | |
| 6,996,061 B2 | 2/2006 | Yang | |
| 7,185,237 B2 | 2/2007 | Stephenson et al. | |
| 7,720,954 B2 | 5/2010 | Raja et al. | |
| 8,768,391 B2 | 7/2014 | Ren et al. | |
| 8,954,514 B2 | 2/2015 | Gunasekara | |
| 2008/0233966 A1* | 9/2008 | Scheim | H04L 5/0023 455/452.1 |
| 2011/0072127 A1 | 3/2011 | Gerber et al. | |
| 2013/0272121 A1 | 10/2013 | Stanwood et al. | |
| 2013/0308461 A1 | 11/2013 | Stanwood et al. | |
| 2015/0131545 A1* | 5/2015 | Ameigeiras Gutierrez | H04W 72/087 370/329 |

(Continued)

FOREIGN PATENT DOCUMENTS

WO 2012016470 2/2012

*Primary Examiner* — Paul H Masur
*Assistant Examiner* — Kabir Jahangir
(74) *Attorney, Agent, or Firm* — Charles E. Bergere (57) ABSTRACT

In one embodiment, a self-healing baseband unit for modifying a key parameter indicator (KPI) value includes a processor that executes a real-time platform health processing agent that generates a fault alarm message based on real-time platform health data received from various components of the baseband unit. The baseband unit includes a L1 sub-system connected via a shared memory to a LL2 processing agent. The L2 processing agent includes a data plane processing module for generating control data and a scheduling module. The scheduling module includes a scheduler trade-off module for generating a trade-off value based on the KPI value and the fault alarm message, and an air interface scheduler that modifies primary uplink and downlink transmission schedules based on the trade-off value, a bearer QoS value, and the control data. The KPI is modified by transmission and reception using the modified uplink and downlink transmission schedules.

20 Claims, 6 Drawing Sheets

(56) References Cited

U.S. PATENT DOCUMENTS

2015/0334599 A1* 11/2015 Maaref ................ H04L 5/0041
370/236
2015/0350938 A1* 12/2015 Heikkila ............... H04W 24/08
370/252

* cited by examiner

TRAFFIC SCHEDULING SYSTEM FOR WIRELESS COMMUNICATION SYSTEM

BACKGROUND

The present invention generally relates to cellular communication systems, and, more particularly, to base stations used in cellular communication systems.

A cellular communication system includes an internet protocol (IP) gateway, a mobile switching center (MSC), home location registers (HLR), base station controllers (BSC), base transceiver stations (BTSs), and multiple user equipments (UEs). A BTS facilitates communication between the UEs and the MSC over a cellular network, and communicates with the IP gateway or a serving gateway (SGW) for providing IP-based network services from a core network to the UEs serviced by the BTS. The core network can be a packet-switched core network. The term BTS in the GSM standard corresponds to a Node-B in the third generation (3G).

The third generation partnership project (3GPP) introduces a long term evolution (LTE) system as an effective solution to the increasing performance requirements of mobile broadband communications. The LTE radio interface and radio network architecture ensures a high data transfer rate, reduced latency, data packet optimization, and improved system capacity and coverage. The LTE system offers an evolved universal terrestrial radio access network (E-UTRAN) as an air interface. The E-UTRAN includes several evolved Node-Bs (eNodeBs) that are also referred to as base stations or access points and correspond to the BTS of the cellular communication system. The eNodeBs are distributed across multiple cells, where each cell typically has one eNodeB. Each eNodeB communicates with multiple UEs located within the coverage area of a cell.

Every eNodeB includes a base station sub-system for transmitting and receiving radio-frequency (RF) signals to and from the UEs. The base station sub-system includes a baseband unit, an RF transceiver, and an antenna. The baseband unit modulates a carrier wave by changing one or more characteristics of the carrier wave, viz. amplitude, frequency, and phase, based on in-phase and quadrature-phase (I/Q) samples generated by a layer 1 (L1) processor included in the baseband unit. The RF transceiver transmits the modulated carrier wave on a transmission medium using the antenna. The transmission medium is divided into multiple communication channels based on available RF range. Communication channels for communication from the eNodeB to the UEs are referred to as downlink communication channels. Communication channels for communication from the UEs to the eNodeB are referred to as uplink communication channels. The uplink and downlink data plane communication between the eNodeBs and the UEs is enabled by a user plane protocol stack that can be divided into layer 1 (L1) and layer 2 (L2), respectively.

Figure 1:
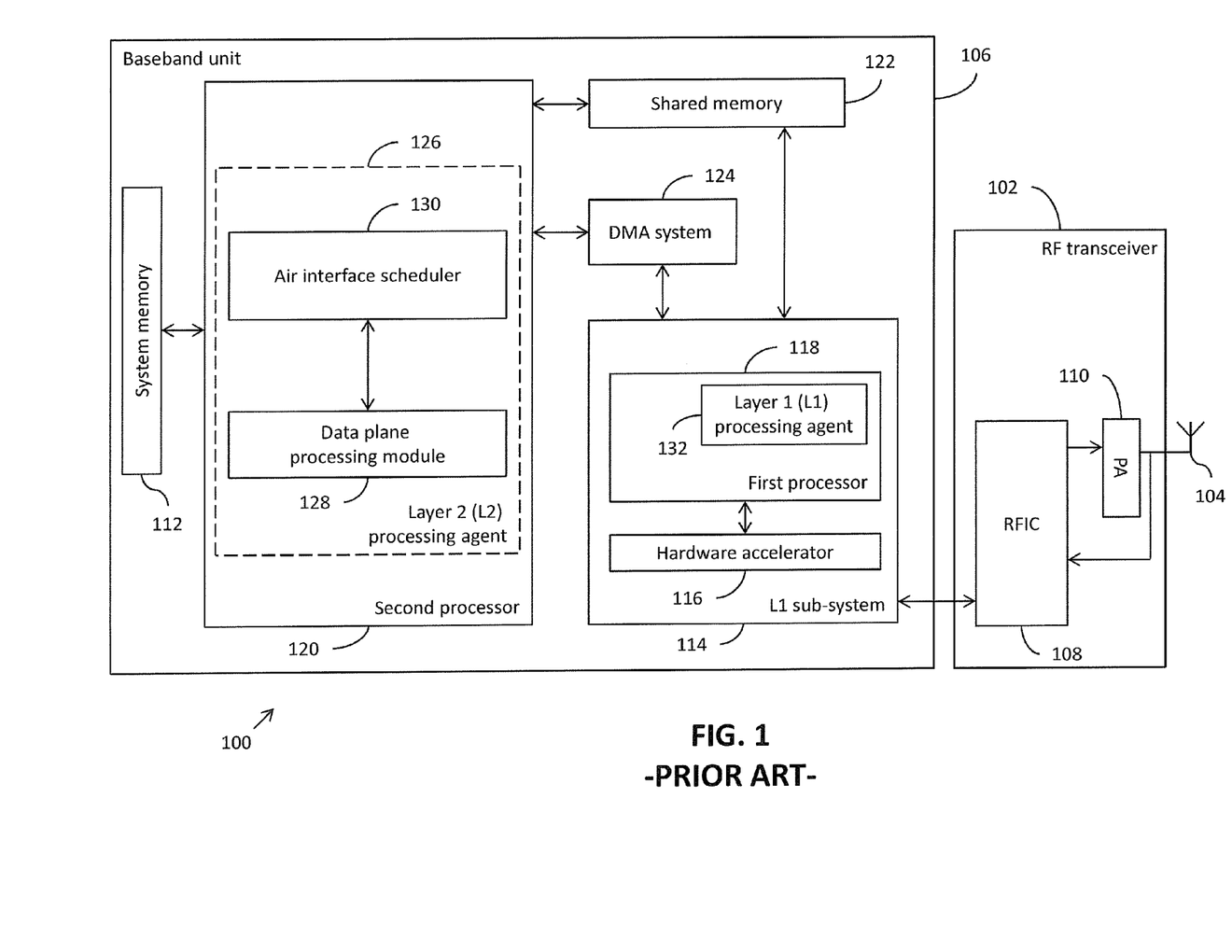
FIG. 1 is a schematic block diagram of a conventional base station sub-system.

FIG. 1 illustrates a conventional base station sub-system 100 that includes an RF transceiver 102, an antenna 104, and a conventional baseband unit 106 connected to the RF transceiver 102, which is in turn connected to the antenna 104 for transmitting the modulated carrier wave (i.e., a "high-power RF signal"). The base station sub-system 100 is included in a conventional eNodeB (not shown) that communicates with multiple UEs in a cellular network (not shown).

The RF transceiver 102 includes an RF integrated circuit (RFIC) 108 and a power amplifier 110. The baseband unit 106 includes a system memory 112, a L1 sub-system 114 that includes a hardware accelerator 116 and a first processor 118, a second processor 120, a shared memory 122, and a direct memory access (DMA) system 124.

The system memory 112 is used to store downlink data packets that are received from a core network, which is a packet switched IP network (not shown). The system memory 112 could be an external storage device that is connected to the baseband unit 106 as a peripheral device.

The second processor 120 is connected to the system memory 112 for receiving the downlink data packets. A L2 processing agent 126 runs on the second processor 120. The L2 processing agent 126 includes a data plane processing module 128 and an air interface scheduler 130.

The data plane processing module 128 performs L2 processing of the wireless protocol stack. The data plane processing module 128 receives the downlink data packets from the system memory 112 and processes them to generate control data and downlink transport blocks (TBs). The downlink data packets are transmitted from the system memory 112 to the data plane processing module 128 via a data path established by the second processor 120 between the data plane processing module 128 and the system memory 112. The control data is used for generation of downlink TBs and for scheduling the transmission of the downlink TBs on a downlink communication channel to the UEs in the cellular network. Similarly, the data plane processing module 128 receives uplink TBs from the L1 processing agent 132 via another data path and generates the uplink data packets.

The air interface scheduler 130 receives the control data from the data plane processing module 128 by way of a control path established by the second processor 120 between the data plane processing module 128 and the air interface scheduler 130. The air interface scheduler 130 further identifies quality of service (QoS) information for the UEs being serviced by the eNodeB according to the 3GPP specifications for LTE and LTE-advanced (LTE-A) standards. In another example, the air interface scheduler 130 identifies the QoS information based on the type of UEs in the cellular network being serviced by the eNodeB. The QoS information for a UE supporting third generation (3G) networks may vary from another UE supporting fourth generation (4G/LTE) networks. For example, the QoS information may include a minimum bandwidth to be provided to the UEs for the uplink and downlink communication channels. Such QoS information that is being determined by the air interface scheduler 130 is referred to as bearer QoS values. Based on a bearer QoS value and the control data, the air interface scheduler 130 generates a downlink transmission schedule for generating downlink TBs by data plane processing module 128 and for scheduling transmission of the downlink TBs via the downlink communication channel. The air interface scheduler 130 may also generate scheduling information for reception of uplink TBs that may be transmitted from the UEs via the uplink communication channel. Thus, the air interface scheduler 130 also generates an uplink transmission schedule for the uplink communication channel based on the bearer QoS value.

The first processor 118 is connected to the second processor 120 by way of the shared memory 122 for receiving the downlink TBs. A L1 processing agent 132 runs on the first processor 118. The downlink TBs are transmitted from the data plane processing module 128 to the L1 processing agent 132 via a data path established by the first and second processors 118 and 120. The L1 processing agent 132 performs processing for a L1 of the wireless protocol stack for the downlink TBs. The L1 processing agent 132 receives and processes the downlink TBs for generating downlink in-phase and quadrature-phase (I/Q) samples. The L1 processing agent 132 further receives the downlink and uplink transmission schedules via a control path established by the first and second processors 118 and 120 between the air interface scheduler 130 and the L1 processing agent 132 using the shared memory 122. The downlink I/Q samples are provided to the RFIC 108 for transmission on the downlink communication channel based on the downlink transmission schedule. For the uplink communication, uplink I/Q samples are received by the L1 processing agent 132 from the RFIC 108 based on the uplink transmission schedule. The L1 processing agent 132 processes the received uplink I/Q samples to generate the uplink TBs.

The DMA system 124 is connected to the first and second processors 118 and 120, and the shared memory 122 for enabling storage and retrieval of the uplink and downlink TBs, the uplink and downlink I/Q samples, and various parameters by the first and second processor 118 and 120 for L1 and L2 processing, respectively. Such parameters can include polynomial weights for digital pre-distortion. The shared memory 122 may be a random access memory (RAM) such as a dynamic RAM (DRAM), a static RAM (SRAM), or a double-data rate (DDR) memory.

The hardware accelerator 116 is connected between the first processor 118 and the RFIC 108. The hardware accelerator 116 executes a pre-defined set of instructions and enables processing of the uplink and downlink I/Q samples before transmission of the downlink I/Q samples and after reception of the uplink I/Q samples. The hardware accelerator 116 is any one of a multi-accelerator platform such as MAPLE, a digital front end (DFE) accelerator, or ICs programmed for computationally intensive functions. The baseband unit 106 may include multiple such accelerators (not shown). Accelerators such as cryptographic accelerators or packet processing accelerators may be included in an L2 sub-system of the baseband unit 106 that includes the second processor 120.

The RFIC 108 receives uplink analog RF signals from the UEs by way of the uplink communication channel and generates the uplink I/Q samples. The RFIC 108 further receives the downlink I/Q samples from the L1 processing agent 132 and generates downlink analog RF signals. The PA 110 is connected to the RFIC 108 for receiving and amplifying the downlink analog RF signals for transmission to the UEs over the downlink communication channel using the antenna 104.

The downlink and the uplink TBs are transmitted and received based on the downlink and uplink transmission schedules generated by the air interface scheduler 130 being executed on the second processor 120. The components of the baseband unit 106 may face several platform health problems such as overloading of the hardware accelerator 116, over-run of the DMA system 124, bandwidth overloading of the shared and system memories 122 and 112, and processing overload of the first processor 118 that occur in real-time, and hence are unforeseen. However, since the air interface scheduler 130 in the second processor 120 does not receive feedback regarding any real-time parameters associated with the aforementioned platform health problems, the downlink and uplink transmission schedules are not modified to address and remedy the platform health problems. Thus, even though the first processor 118 may be overloaded, the second processor 120 may schedule transmission of more downlink TBs by the first processor 118, thereby leading to overloading and shut-down of the first processor 118 and the baseband unit 106. Similarly, the hardware accelerator 116 or the DMA system 124 may malfunction and shut-down. Thus, the eNodeB may shut-down and go out of service. Since the real-time health parameters are not monitored by the air interface scheduler 130, the performance of the eNodeB is unstable and hence, the bandwidth provided to the UEs for the uplink and downlink communication channels may not meet the desired bearer QoS value as specified by the wireless protocol stack, or the 3G and 4G standards.

A known technique to overcome the aforementioned problem uses buffers at the end-points of the BTS and the IP gateway. The buffers measure a delay in transmission of a data packet between the BTS and the IP gateway. When the delay exceeds a predetermined threshold value, a value of a QoS parameter of a service provided by the BTS to the UE is downgraded. However, the aforementioned technique does not enable monitoring of the aforementioned platform health problems caused in a baseband unit of the BTS. Further, the aforementioned technique requires utilization of components external to the BTS such as the IP gateway, and hence, is not a feasible solution. Furthermore, due to stringent uptime requirements by LTE operators, the eNodeB is required to be highly stable and operational in 99.999% of the scenarios.

Therefore, it would be advantageous to have a baseband unit that monitors real-time parameters associated with platform health problems of the baseband unit and other peripheral devices of an eNodeB, remedies the platform health problems in real-time, prevents shut-down of various components of the baseband unit, prevents the eNodeB from going out of service, and maintains the desired bearer QoS value for the UEs being serviced.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a system for scheduling transmission in uplink and downlink communication channels of a wireless communication network is provided. The system includes first and second processors, and a shared memory. The first processor executes a layer 1 (L1) processing agent for receiving a first set of transport blocks (downlink TBs) based on a downlink transmission schedule. The first processor then processes the downlink TBs and generates a first set of in-phase and quadrature-phase (I/Q) samples, transmits the first set of I/Q samples over the downlink communication channel based on the downlink transmission schedule, receives a second set of I/Q samples via the uplink communication channel based on an uplink transmission schedule, processes the second set of I/Q samples and generates a second set of transport blocks (uplink TBs), determines a health parameter associated with the first processor, and generates real-time platform health data based on the health parameter. The shared memory is connected to the first processor for receiving and storing the real-time platform health data and modified uplink and downlink transmission schedules. The second processor is connected to the shared memory for executing a real-time platform health processing agent and a layer 2 (L2) processing agent. The real-time platform health processing agent reads the real-time platform health data from the shared memory and generates a fault alarm message. The L2 processing agent includes a data plane processing module and a scheduling module. The data plane processing module performs L2 processing of a wireless protocol stack and receives a first set of data packets from a system memory, processes the first set of data packets and generates the downlink TBs, receives the uplink TBs from the first processor via the shared memory, processes the uplink TBs and generates a second set of data packets, and generates control data corresponding to at least one of the uplink and downlink communication channels. The scheduling module receives the control data and the fault alarm message, determines a key performance indicator (KPI) value and a bearer quality of service (QoS) value of user equipments (UEs) the UEs being serviced (by the system, which may be an eNodeB), determines a trade-off value based on the fault alarm message and the KPI value, modifies at least one of the uplink and downlink transmission schedules based on the trade-off value, the bearer QoS value, and the control data, and generates and provides the modified uplink and downlink transmission schedules to the data plane processing module for generation of downlink TBs and to the first processor via the shared memory. After the first processor receives the modified uplink and downlink transmission schedules and receives and/or transmits a third set of I/Q samples over the uplink and downlink communication channels based on the modified uplink and downlink transmission schedules, respectively. The KPI value of at least one of the uplink and downlink communication channels is modified based on the real-time platform health data.

In another embodiment of the present invention, a method for modifying a key parameter indicator (KPI) value of uplink and downlink communication channels of a wireless communication network is provided. In one embodiment, the KPI value is indicative of at least one of a throughput value of the uplink and downlink communication channels, count of users in the wireless communication network, count of bearers in the uplink and downlink communication channels, and scheduling delay. The method includes receiving a first set of data packets from a system memory, processing the first set of data packets and generating a first set of transport blocks (downlink TBs), processing the downlink TBs and generating a first set of in-phase and quadrature-phase (I/Q) samples, and transmitting the first set of I/Q samples via the downlink communication channel based on a downlink transmission schedule. The method further includes receiving a second set of I/Q samples by way of the uplink communication channel based on an uplink transmission schedule, processing the second set of I/Q samples and generating a second set of transport blocks (uplink TBs), and receiving and processing the uplink TBs for generating a second set of data packets. A health parameter associated with the uplink and downlink communication channels is determined. Real-time platform health data is generated based on the health parameter and stored in a shared memory. The method further includes generating a fault alarm message based on the real-time platform health data, generating control data for modification of the uplink and downlink transmission schedules, determining the KPI value and a bearer quality of service (QoS) value of the UEs being serviced by the eNodeB, determining a trade-off value based on the fault alarm message and the KPI value, and modifying at least one of the uplink and downlink transmission schedules based on the trade-off value, the bearer QoS value, and the control data. Subsequently, third and fourth sets of I/Q samples via the uplink and downlink communication channels are transmitted and received based on the modified uplink and downlink transmission schedules, respectively. The KPI value of at least one of the uplink and downlink communication channels is modified based on the real-time platform health data.

In yet another embodiment, a baseband unit for a wireless communication system is provided. The baseband unit is connected to a system memory that stores a plurality of output data packets and is included in an eNodeB. The baseband unit includes a processor and a shared memory for storing a real-time platform health data and modified uplink and downlink transmission schedules. The processor is connected to the system and shared memories for executing a real-time platform health processing agent and a layer 2 (L2) processing agent. The real-time platform health processing agent receives the real-time platform health data and generates a fault alarm message. The L2 processing agent includes a data plane processing module and a scheduling module. The data plane processing module performs L2 processing of a wireless protocol stack for receiving the plurality of output data packets, processing the plurality of output data packets for generating a plurality of output transport blocks (downlink TBs), and generating control data corresponding to at least one of the uplink and downlink communication channels. The scheduling module generates an uplink transmission schedule that is utilized for receiving a plurality of input transport blocks (uplink TBs) and a downlink transmission schedule that is utilized for transmitting the downlink TBs, receives the control data and the fault alarm message, and determines a key performance indicator (KPI) value and a bearer quality of service (QoS) value of user equipment (UEs) being serviced by the eNodeB. The KPI value is indicative of at least one of a throughput value of the uplink and downlink communication channels, count of users in the wireless communication network, count of bearers in the uplink and downlink communication channels, and scheduling delay. The scheduling module further determines a trade-off value based on the fault alarm message and the KPI value, modifies at least one of the uplink and downlink transmission schedules based on the trade-off value, the bearer QoS value, and the control data, generates the modified uplink and downlink transmission schedules, and stores the modified uplink and downlink transmission schedules in the shared memory. Thus, the KPI value of at least one of the uplink and downlink communication channels is modified based on the real-time platform health data.

Various embodiments of the present invention provide a base station sub-system for an eNodeB. The base station sub-system includes a baseband unit. The baseband unit is connected to a system memory that stores a plurality of output data packets. The baseband unit includes a L2 processor, a L1 sub-system that includes a hardware accelerator, a L1 processor, a shared memory, and a direct memory access (DMA) system. The shared memory stores real-time platform health data that are real-time parameters associated with platform health problems occurring in the baseband unit. The L2 processor is connected to the system and shared memories for executing a real-time platform health processing agent and a L2 processing agent that includes a data plane processing module and a scheduling module. The real-time platform health processing agent generates a fault alarm message based on the real-time platform health data. The data plane processing module performs L2 processing of a wireless protocol stack for processing the plurality of output data packets and generating output transport blocks (downlink TBs), and generating control data corresponding to at least one of the uplink and downlink communication channels.

The scheduling module generates an uplink transmission schedule that is used for receiving input transport blocks (uplink TBs) and a downlink transmission schedule that is used for transmitting the downlink TBs, and determines a key performance indicator (KPI) value and a bearer quality of service (QoS) value of the UEs being serviced by the eNodeB. The KPI value is indicative of at least one of a throughput value of the uplink and downlink communication channels, count of users in the wireless communication network, count of bearers in the uplink and downlink communication channels, and scheduling delay. The scheduling module further determines a trade-off value based on the fault alarm message and the KPI value, modifies at least one of the uplink and downlink transmission schedules based on the trade-off value, the bearer QoS value, and the control data, generates the modified uplink and downlink transmission schedules, and stores the modified uplink and downlink transmission schedules in the shared memory. Thus, the KPI value of at least one of the uplink and downlink communication channels is modified based on the real-time platform health data. Thus, the L2 processor monitors the real-time parameters associated with platform health problems of the baseband unit and other peripheral devices of the eNodeB and modifies the downlink and uplink transmission schedules to address the platform health problems of the baseband unit in real-time, thereby preventing shut-down of various components of the baseband unit and the eNodeB and maintaining the desired bearer QoS value for the UEs being serviced by the eNodeB.

Figure 2:
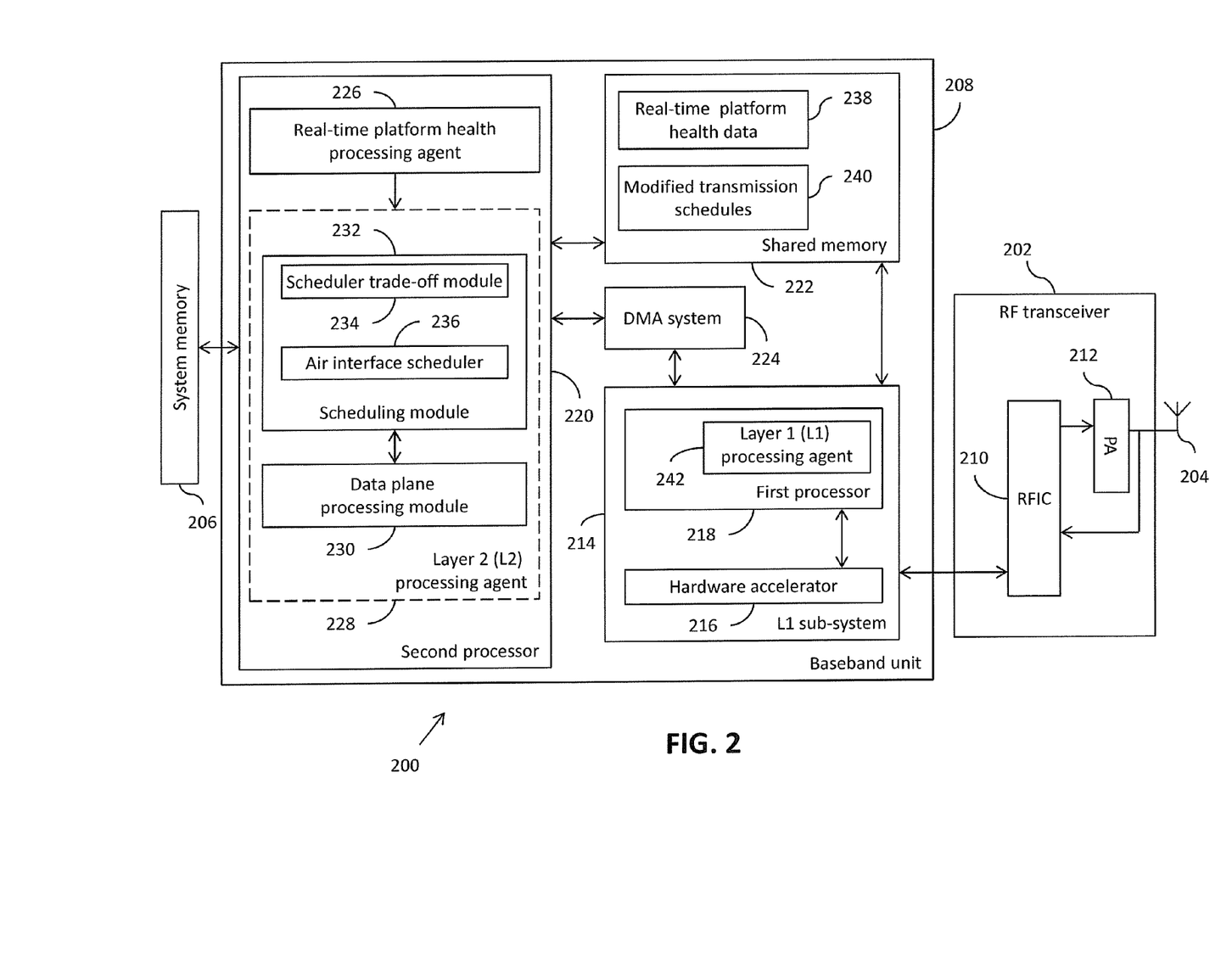
FIG. 2 is a schematic block diagram of a system for scheduling transmission in uplink and downlink communication channels of a wireless communication network in accordance with an embodiment of the present invention.

Referring now to FIG. 2, a schematic block diagram of a base station sub-system 200 in accordance with an embodiment of the present invention is shown. The base station sub-system 200 includes an RF transceiver 202 that is connected to an antenna module 204 for transmitting and receiving analog downlink and analog uplink RF signals, respectively. In an embodiment of the present invention, the base station sub-system 200 is included in an eNodeB (not shown) that communicates with UEs using a primary downlink transmission schedule on a downlink communication channel in a wireless communication network such as a cellular network (not shown). The eNodeB further communicates with an IP gateway or a serving gateway (SGW, not shown) for providing IP-based network services from a core network (not shown) to the UEs serviced by the eNodeB. In one embodiment, the eNodeB conforms to the evolved packet core (EPC) architecture as defined by the LTE and LTE-A standards.

The base station sub-system 200 further includes a system memory 206 and a baseband unit 208. The RF transceiver 202 includes an RF integrated circuit (RFIC) 210 and a power amplifier (PA) 212.

The system memory 206 stores a first set of data packets that are output data packets (hereinafter referred to as "downlink data packets"). In an embodiment of the present invention, the base station sub-system 200 is included in the eNodeB and the downlink data packets are received from the core network by way of the IP gateway or SGW. In an example, the core network is a packet-switched core network. In one embodiment, the system memory 206 is a random access memory (RAM) such as a dynamic random access memory (DRAM), a static random access memory (SRAM), or a double-data rate (DDR) memory. In another embodiment, the system memory 206 is an external storage device that is connected to the baseband unit 208 as a peripheral device.

The baseband unit 208 includes a layer 1 (L1) sub-system 214 that includes a hardware accelerator 216, a first processor 218, a second processor 220, a shared memory 222, and a direct memory access (DMA) system 224.

The second processor 220 is connected to the system memory 206 for receiving the downlink data packets. The second processor 220 executes a real-time platform health processing agent 226 and a L2 processing agent 228. The L2 processing agent 228 includes a data plane processing module 230 and a scheduling module 232. The scheduling module 232 includes a scheduler trade-off module 234 and an air interface scheduler 236. The second processor 220 is connected to an internal memory (e.g., a ROM) that stores a boot code. The boot code is a computer readable code for an operating system that enables execution of the real-time platform health processing agent 226 and the L2 processing agent 228. The second processor 220 retrieves and executes the boot code, and then executes the real-time platform health processing agent 226 and the L2 processing agent 228. The second processor 220 may be a single or multi-core processor. In one embodiment, the second processor 220 is a power architecture core. In another embodiment, the second processor 220 may also be referred to as an L2 processor.

The shared memory 222 is connected between the second processor 220 and the L1 sub-system 214. The components of the baseband unit 208 may face several platform health problems such as, but not limited to, overloading or processing error in the hardware accelerator 216, over-run of the DMA system 224, bandwidth overloading of the shared and system memories 222 and 206, and processing overload of the first processor 218 that occur in real-time due to the primary uplink and downlink transmission schedules. The shared memory 222 stores real-time platform health data 238 that are real-time parameters (hereinafter referred to as "health parameters") associated with platform health problems occurring in the baseband unit 208. For example, the health parameter may be diagnostic information associated with any one of the platform health problems of the first processor 118, the DMA system 224, and the shared and system memories 222 and 206. The platform health problems occurring in the baseband unit 208 may also be related to an L2 sub-system (not shown) of the baseband unit 208 that includes the second processor 220. Such L2 sub-system may also include accelerators for packet processing and cryptography. The health parameters are stored as the real-time platform health data 238 during each transmission time interval (TTI). One TTI corresponds to the time required for transmitting or receiving one sub-frame via the downlink or uplink communication channel, respectively. The shared memory 222 further stores modified uplink and downlink transmission schedules 240 (hereinafter referred to as "modified transmission schedules") that are modified based on the real time platform health data 238 in real-time. The shared memory 222 may be a random access memory (RAM) such as a dynamic random access memory (DRAM), a static random access memory (SRAM), or a double-data rate (DDR) memory.

The real-time platform health processing agent 226 is connected to the shared memory 222 via a data path that is established by the second processor 220. The real-time platform health processing agent 226 is executed independent of the data plane processing module 230 on the second processor 220. The real-time platform health processing agent 226 retrieves the real-time platform health data 238 during each TTI. Subsequently, the real-time platform health processing agent 226 extracts at least one health parameter from the real-time platform health data 238 and generates a fault alarm message when the health parameter exceeds a predetermined threshold health parameter. In one embodiment of the present invention, the health parameter is associated with the overloading or processing error in the hardware accelerator 216 and hence, is referred to as a processor error value. The real-time platform health processing agent 226 extracts the processor error value from the real-time platform health data 238 and generates the fault alarm message when the processor error value exceeds a predetermined threshold processor error value. In one embodiment, the predetermined threshold health parameter and the predetermined threshold processor error value are configured by an operator of the cellular network or the eNodeB and stored as a part of the boot code. In another embodiment, the predetermined threshold health parameter and the predetermined threshold processor error value are configured by an operator in real-time by way of a configuration application being executed by the second processor 220. For example, the operator may set the predetermined threshold health parameter as 80%. If the first processor 218 stores the health parameter associated with processing load of the first processor 218 as 85%, the real-time platform health processing agent 226 generates the fault alarm message as the first processor 218 is overloaded and may shut-down if processing load increases further.

The data plane processing module 230 receives the downlink data packets from the system memory 206 via a data path that is established by the second processor 220 between the data plane processing module 230 and the system memory 206. The data plane processing module 230 performs processing for L2 of the wireless protocol stack. The data plane processing module 230 receives the downlink data packets from the system memory 206 and processes the downlink data packets to generate control data and a first set of transport blocks (TBs). The first set of TBs is hereinafter referred to as "downlink TBs". The control data is used for generating the downlink TBs and for scheduling the transmission of the downlink TBs on the downlink communication channel to the UEs in the cellular network. In one embodiment, the control data also includes scheduling information related to the reception of a second set of TBs (hereinafter referred to as "uplink TBs") on the uplink communication channel from the UEs in the cellular network. The data plane processing module 230 processes the uplink TBs and generates a second set of data packets (hereinafter referred to as "uplink data packets"). In an embodiment of the present invention, the data plane processing module 230 further stores the downlink TBs in the shared memory 222 and retrieves the uplink TBs from the shared memory 222.

The scheduler trade-off module 234 receives the fault alarm message from the real-time platform health processing agent 226 via a data path that is established by the second processor 220 between the scheduler trade-off module 234 and the real-time platform health processing agent 226. The scheduler trade-off module 234 further determines a key performance indicator (KPI) value. The KPI value is indicative of at least one of a throughput value of the uplink and downlink communication channels, count of users or UEs in the cellular network, count of bearers in the uplink and downlink communication channels, and scheduling delay. The scheduler trade-off module 234 calculates a trade-off value based on the fault alarm message and the KPI value. The fault alarm message is indicative of system stability of the baseband unit 208 and the KPI value is indicative of the eNodeB performance. Thus, the scheduler trade-off module 234 determines a trade-off between the system stability and the eNodeB performance to determine whether eNodeB performance should be degraded to improve system stability.

The air interface scheduler 236 receives the control data from the data plane processing module 230 via a control path established by the second processor 220 between the data plane processing module 230 and the air interface scheduler 236. The air interface scheduler 236 generates the primary uplink and downlink transmission schedules prior to reception of the trade-off value. In one embodiment, the air interface scheduler 236 uses the primary uplink and downlink transmission schedules predefined by the operator using the wireless protocol stack. When platform health problems occur in the baseband unit 208 due to the primary uplink and downlink transmission schedules, the air interface scheduler 236 further receives the trade-off value from the scheduler trade-off module 234 via a control path established by the second processor 220 between the scheduler trade-off module 234 and the air interface scheduler 236. The air interface scheduler 236 further determines quality of service (QoS) information for the UEs being serviced by the eNodeB according to the 3GPP specifications for LTE and LTE-A standards. In another embodiment, the air interface scheduler 236 identifies the QoS information based on the type of UEs in the cellular network being serviced by the eNodeB. The QoS information may include minimum bandwidth to be provided to the UEs for the uplink and downlink communication channels. Such QoS information being determined by the air interface scheduler 236 is referred to as bearer QoS values. Based on a bearer QoS value, the trade-off value, and the control data, the air interface scheduler 236 generates and modifies the downlink transmission schedule for generating the downlink TBs and for scheduling transmission of the downlink TBs by way of the downlink communication channel. The air interface scheduler 236 further generates scheduling information for reception of the uplink TBs that are transmitted from the UEs by way of the uplink communication channel. Thus, the air interface scheduler 236 also generates and modifies the uplink transmission schedule for the uplink communication channel based on a bearer QoS value, the trade-off value, and the control data. Thus, the fault alarm message is a trigger for modification of the uplink and downlink transmission schedules when platform health problems originate in the baseband unit 208. After generation of the modified uplink and downlink transmission schedules, the air interface scheduler 236 stores the modified uplink and downlink transmission schedules as modified transmission schedules 240 in the shared memory 222 and provides the modified transmission schedules to the data plane processing module 230 for generation of downlink TBs. In an embodiment of the present invention, the air interface scheduler 230 allocates a first set of resource blocks of a plurality of resource blocks for the transmission of the downlink TBs via the downlink communication channel and reception of the uplink TBs by way of the uplink communication channel. The transmission schedules are allocated in terms of resource blocks, where a resource block is defined as the smallest unit of transmission resource. Thus, the air interface scheduler 230 modifies the allocation of resource blocks for the subsequent downlink and uplink TBs, thereby generating the modified uplink and downlink transmission schedules. In one embodiment, the air interface scheduler 230 modifies the primary uplink and downlink transmission schedules to reduce the data rate to be processed by the first processor 218 and the hardware accelerator 216 or reduces the count of memory blocks retrieved and stored by the DMA system 224, thereby reducing the processing load of the first processor 218 and the hardware accelerator 216 or error count of the DMA system 224.

The first processor 218 is connected to the second processor 220 via the shared memory 222 for receiving the downlink TBs. The first processor 218 executes a L1 processing agent 242. The downlink TBs are transmitted from the data plane processing module 230 to the L1 processing agent 242 via a data path established by the first and second processors 218 and 220. The L1 processing agent 242 performs processing of L1 of the wireless protocol stack for the downlink TBs. The L1 processing agent 242 receives and processes the downlink TBs for generating a first set of in-phase and quadrature-phase (I/Q) samples (hereinafter referred to as "downlink I/Q samples"). The L1 processing agent 242 further receives the primary downlink and uplink transmission schedules via a control path established by the first and second processors 218 and 220 between the air interface scheduler 236 and L1 processing agent 242 using the shared memory 222. The downlink I/Q samples are provided to the RFIC 210 for transmission on the downlink communication channel based on the primary downlink transmission schedule. For the uplink communication, a second set of uplink I/Q samples (hereinafter referred to as "uplink I/Q samples") is received at the L1 processing agent 242 from the RFIC 210 based on the primary uplink transmission schedule. The uplink I/Q samples are processed and the uplink TBs are generated. The first processor 218 generates the health parameter with diagnostic information associated with the processing load. The health parameter is stored by the first processor 218 during each TTI. The first processor 218 further identifies bandwidth overloading of DDR memories such as the shared and system memories 122 and 112 to generate health parameters associated with the bandwidth overloading. The first processor 218 stores the health parameter in the shared memory 222 as the real-time platform health data 238. In one embodiment, the first processor 218 is a single or multi-core processor or a digital signal processor (DSP). In another embodiment, the first processor 218 may also be an L1 processor.

After modification of the primary uplink and downlink transmission schedules by the air interface scheduler 236 based on the real-time platform health data 238 by the second processor 220, the L1 processing agent 242 further receives the modified transmission schedules 240 by way of the control path established by the first and second processors 218 and 220 between the air interface scheduler 236 and L1 processing agent 242 using the shared memory 222. Subsequently, the L1 processing agent 242 receives and processes a third set of TBs (hereinafter referred to as "subsequent downlink TBs") for generating a third set of in-phase and quadrature-phase (I/Q) samples (hereinafter referred to as "subsequent downlink I/Q samples"). The subsequent downlink I/Q samples are provided to the RFIC 210 for transmission on the downlink communication channel based on the modified downlink transmission schedule. Similarly, the L1 processing agent 242 receives a fourth set of in-phase and quadrature-phase (I/Q) samples (hereinafter referred to as "subsequent uplink I/Q samples") from the RFIC 210 and processes the subsequent uplink I/Q samples for generating a fourth set of TBs (hereinafter referred to as "subsequent uplink TBs"). The subsequent uplink I/Q samples are received from the RFIC 210 and provided to the data plane processing module 230 based on the modified uplink transmission schedule. Since the throughput of the uplink and downlink communication channels is being modified based on the health parameter, the KPI value of at least one of the uplink and downlink communication channels is modified in real-time based on the platform health problems in the baseband unit 208.

The DMA system 224 is connected to the first and second processors 218 and 220, and the shared memory 222 for enabling storage and retrieval of the uplink and downlink TBs, modified transmission schedules, and real-time platform health data. The DMA system 224 generates health parameter when the DMA system 224 encounters platform health problems such as DMA overrun. The health parameter is stored in the shared memory 222 as real-time platform health data 238 during each TTI. In one embodiment, the first processor 218 receives the health parameter from the DMA system 224 and stores the health parameter in the shared memory 222.

The hardware accelerator 216 is connected between the first processor 218 and the RFIC 210. The hardware accelerator 216 executes a pre-defined set of instructions and enables processing of the uplink and downlink I/Q samples before transmission of the downlink I/Q samples and after reception of the uplink I/Q samples. The hardware accelerator 216 is any one of a multi-accelerator platform such as MAPLE, a digital front end (DFE) accelerator, or ICs programmed for computationally intensive functions. The baseband unit 208 may include multiple such accelerators (not shown). Accelerators such as cryptographic accelerators or packet processing accelerators may be included in the L2 sub-system of the baseband unit 208 that includes the second processor 220. When the hardware accelerator 216 is overloaded or a processing error occurs in the hardware accelerator 216, the hardware accelerator 216 identifies the processing error associated with the pre-defined set of instructions and generates the processor error value. Subsequently, the processor error value is stored as the real-time platform health data 238 in the shared memory 222 during each TTI. In one embodiment, the first processor 218 receives the health parameter from the hardware accelerator 216 and stores the health parameter in the shared memory 222. Similarly, the processor error values are generated when the accelerators of the L2 sub-system encounter processing errors or are overloaded.

The RFIC 210 receives a first analog input signal (also referred to as "uplink analog RF signal") from the UEs by way of the uplink communication channel and generates the uplink I/Q samples. The RFIC 210 further receives the downlink I/Q samples from the L1 processing agent 242 and generates a first analog output signal (also referred to as "downlink analog RF signal"). Subsequent to modification of the uplink and downlink transmission schedules, the RFIC 210 receives second analog input signal (also referred to as "subsequent uplink analog RF signal") from the UEs on the uplink communication channel by way of the antenna 204 and generates the subsequent uplink I/Q samples based on the modified uplink transmission schedule. Similarly, the RFIC 210 further receives the subsequent downlink I/Q samples from the L1 processing agent 242 and generates a second analog output signal (also referred to as "subsequent downlink analog RF signal").

The PA 212 is connected to the RFIC 210 for receiving the downlink analog RF signals and generates amplified downlink analog RF signals for transmission to the UEs on the downlink communication channel via the antenna 204.

For example, in one embodiment, during downlink communication, the L2 processing agent 228 provides the primary downlink transmission schedule to the L1 processing agent 242 for transmission of the downlink TBs in a first TTI. During a second TTI, the first processor 218 that executes the L1 processing agent 242 identifies a processing overload for downlink communication and generates the health parameter. During a third TTI, the first processor 218 stores the health parameter in the shared memory 222 as the real-time platform health data 238. During a fourth TTI, the second processor 220 executes the real-time platform health processing agent 226, the scheduler trade-off module 234, and the air interface scheduler 236 to generate the modified downlink transmission schedule based on the health parameter. The second processor 220 generates the modified downlink transmission schedule such that the count of subsequent downlink TBs to be transmitted is reduced as compared to the downlink TBs transmitted in the first TTI. Thus, the processing load of the first processor 218 can be reduced based on the modified downlink transmission schedule. Further, during the fourth TTI, the L2 processing agent 228 provides the modified downlink transmission schedule to the L1 processing agent 242 for transmission of the subsequent downlink TBs. During a fifth TTI, the L1 processing agent 242 being executed on the first processor 218 receives the modified downlink transmission schedule and transmits the reduced number of subsequent downlink TBs to the UEs, thereby stabilizing the first processor 218. Thus, the time required to stabilize the first processor 218 during downlink communication is 3 TTI or 3 milliseconds, i.e., between the second and fifth TTIs.

In another example, during uplink communication, the L2 processing agent 228 provides the primary uplink transmission schedule to the L1 processing agent 242 for reception of the uplink I/Q samples from a UE in a first TTI. During a second TTI, the first processor 218 that executes the L1 processing agent 242 receives uplink I/Q samples from the UE. During a third TTI, the first processor 218 identifies a processing overload for uplink communication and generates the health parameter. During a fourth TTI, the first processor 218 stores the health parameter in the shared memory 222 as the real-time platform health data 238. During a fifth TTI, the second processor 220 executes the real-time platform health processing agent 226, the scheduler trade-off module 234, and the air interface scheduler 236 to generate the modified uplink transmission schedule based on the health parameter. The second processor 220 generates the modified uplink transmission schedule such that the count of subsequent uplink TBs to be transmitted by the UE and received by the eNodeB is reduced as compared to the uplink I/Q samples received during the second TTI. Thus, the processing load of the first processor 218 is reduced based on the modified downlink transmission schedule. Further, during the fifth TTI, the L2 processing agent 228 provides the modified uplink transmission schedule to the L1 processing agent 242 for reception of the subsequent downlink I/Q samples. The modified uplink transmission schedule is provided to the UE by the eNodeB and the UE consumes six TTIs for modifying the analog uplink signal transmitted by the UE to the eNodeB. During a twelfth TTI, the L1 processing agent 242 being executed on the first processor 218 receives the subsequent uplink I/Q samples based on the modified uplink transmission schedule, thereby stabilizing the first processor 218. Thus, the time required to stabilize the first processor 218 during uplink communication is 9 TTI or 9 milliseconds, i.e., between the third and twelfth TTIs.

It will be apparent to a person skilled in the art that apart from the baseband unit 208, other components such as the second processor 220 and digital pre-distorters (DPDs, not shown), and peripheral devices (not shown) in the eNodeB can also store health parameters as real-time platform health data 238 in the shared memory 222, thereby allowing modification of the KPI of the uplink and downlink communication channels and self-healing of the eNodeB. Thus, the second processor 220 monitors the real-time parameters associated with platform health problems of the baseband unit 208 and other peripheral devices of the eNodeB and modifies the downlink and uplink transmission schedules to address the platform health problems of the baseband unit 208 in real-time. Thus, shut-down of various components of the baseband unit 208 and the eNodeB is prevented and the desired bearer QoS value for the UEs being serviced by the eNodeB is maintained. Thus, the eNodeB that includes the baseband unit 208 self-heals in real-time to counter unforeseen platform health problems.

Referring now to FIGS. 3A-3D, flow charts illustrating a method for modifying the key parameter indicator (KPI) value of the uplink and downlink communication channels of the wireless communication network such as the cellular network in accordance with an embodiment of the present invention is shown.

Figure 3A:
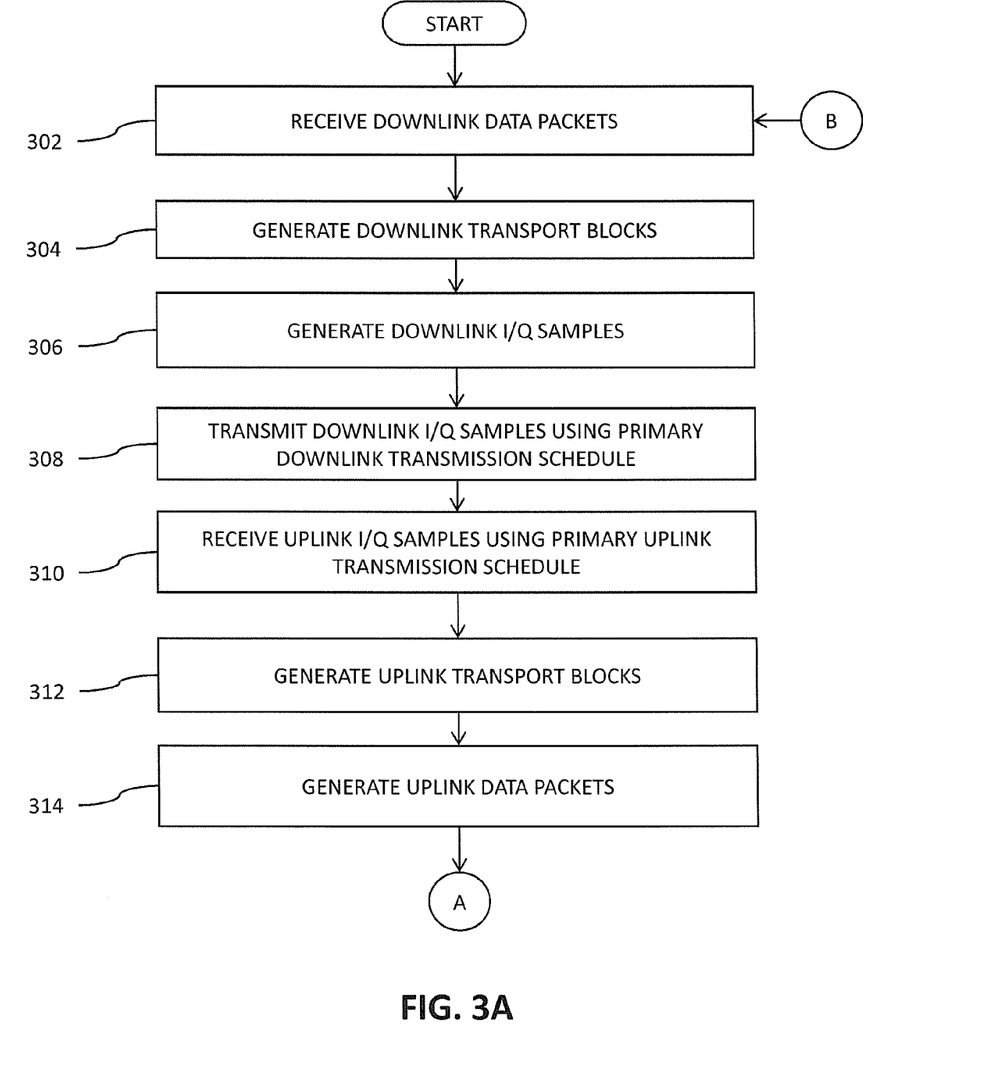
FIGS. 3A-3D are flow charts illustrating a method for modifying a key parameter indicator (KPI) value of uplink and downlink communication channels of a wireless communication network in accordance with an embodiment of the present invention.

At step 302, the data plane processing module 230 receive the first set of data packets (downlink data packets) from the system memory 206. At step 304, the downlink data packets are processed and the first set of transport blocks (downlink TBs) are generated by the data plane processing module 230. At step 306, the downlink TBs are processed by the L1 processing agent 242 and the first set of in-phase and quadrature-phase (I/Q) samples (downlink I/Q samples) are generated. At step 308, the L1 processing agent 242 transmits the downlink I/Q samples by way of the downlink communication channel based on the primary downlink transmission schedule. At step 310, the second set of I/Q samples (uplink I/Q samples) are received at the L1 processing agent 242 by way of the uplink communication channel based on the primary uplink transmission schedule. At step 312, the uplink I/Q samples are processed by the L1 processing agent 242 and a second set of TBs (uplink TBs) are generated. At step 314, the uplink TBs are processed by the data plane processing module 230 and the second set of data packets (uplink data packets) are generated.

Figure 3B:
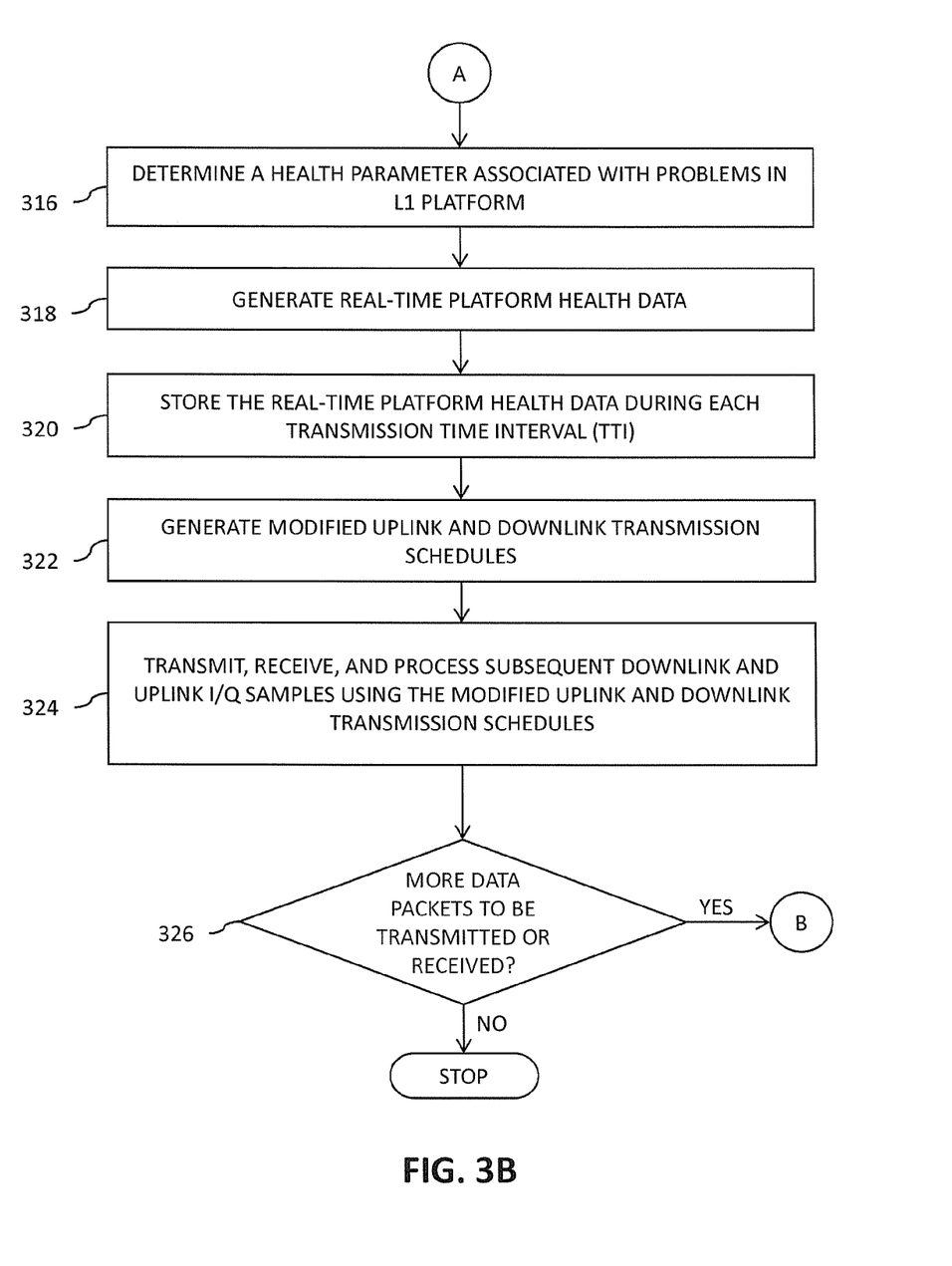

At step 316, a health parameter associated with the uplink and downlink communication channels is determined by the first processor 218. The health parameter is indicative of diagnostic information associated with the platform health problems of the baseband unit 208. The platform health problems are caused due to the us of the primary uplink and downlink transmission schedules. At step 318, the real-time platform health data 238 is generated in the shared memory 222 by the first processor 218 based on the health parameter. At step 320, the real-time platform health data 238 is stored in the shared memory 222 by the first processor 218 during each TTI. At step 322, subsequent to modification of the primary uplink and downlink transmission schedules by the second processor 220 by executing the real-time platform health processing agent 226, the scheduler trade-off module 234, and the air interface scheduler 236, the L1 processing agent 242 receives the modified uplink and downlink transmission schedules from the second processor 220 by way of the shared memory 222. At step 324, the L1 processing agent 242 transmits, receives, and processes the third and fourth sets of I/Q samples (subsequent downlink and uplink I/Q samples) based on the modified uplink and downlink transmission schedules, respectively. Thus, the KPI value of at least one of the uplink and downlink communication channels is modified based on the real-time platform health data 238. At step 326, the L1 processing agent 242 checks to determine if any more data packets are required to be transmitted or received. If at step 326, the L1 processing agent 242 determines that more data packets will be transmitted or received, step 302 is executed.

Figure 3C:
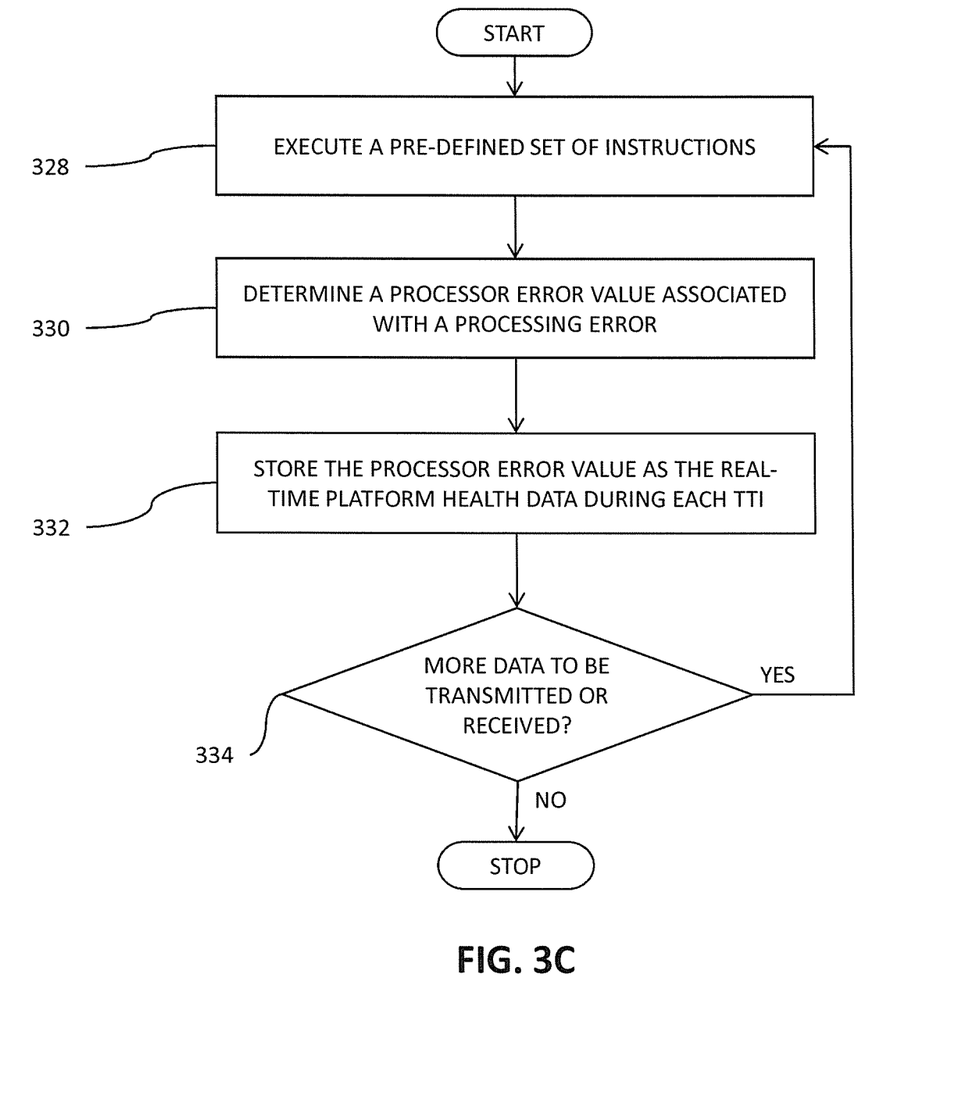

At step 328, the hardware accelerator 216 executes the pre-defined set of instructions for processing of data. If the hardware accelerator 216 is in the L1 sub-system, the hardware accelerator 216 processes the first, second, third and fourth sets of I/Q samples (the downlink I/Q samples, uplink I/Q samples, subsequent downlink I/Q samples, and subsequent uplink I/Q samples). If the hardware accelerator 216 is in the L2 sub-system, the hardware accelerator 216 processes data packets. At step 330, the processor error value associated with processing error of the execution of the pre-defined set of instructions is determined by the hardware accelerator 216. Subsequently, in step 332, the processor error value is stored as the real-time platform health data 238 in the shared memory 222 during each TTI. At step 334, the hardware accelerator 216 checks to determine if any more data is required to be processed. If at step 334, if the hardware accelerator 216 determines that more data is required to be processed, step 328 is executed.

Figure 3D:
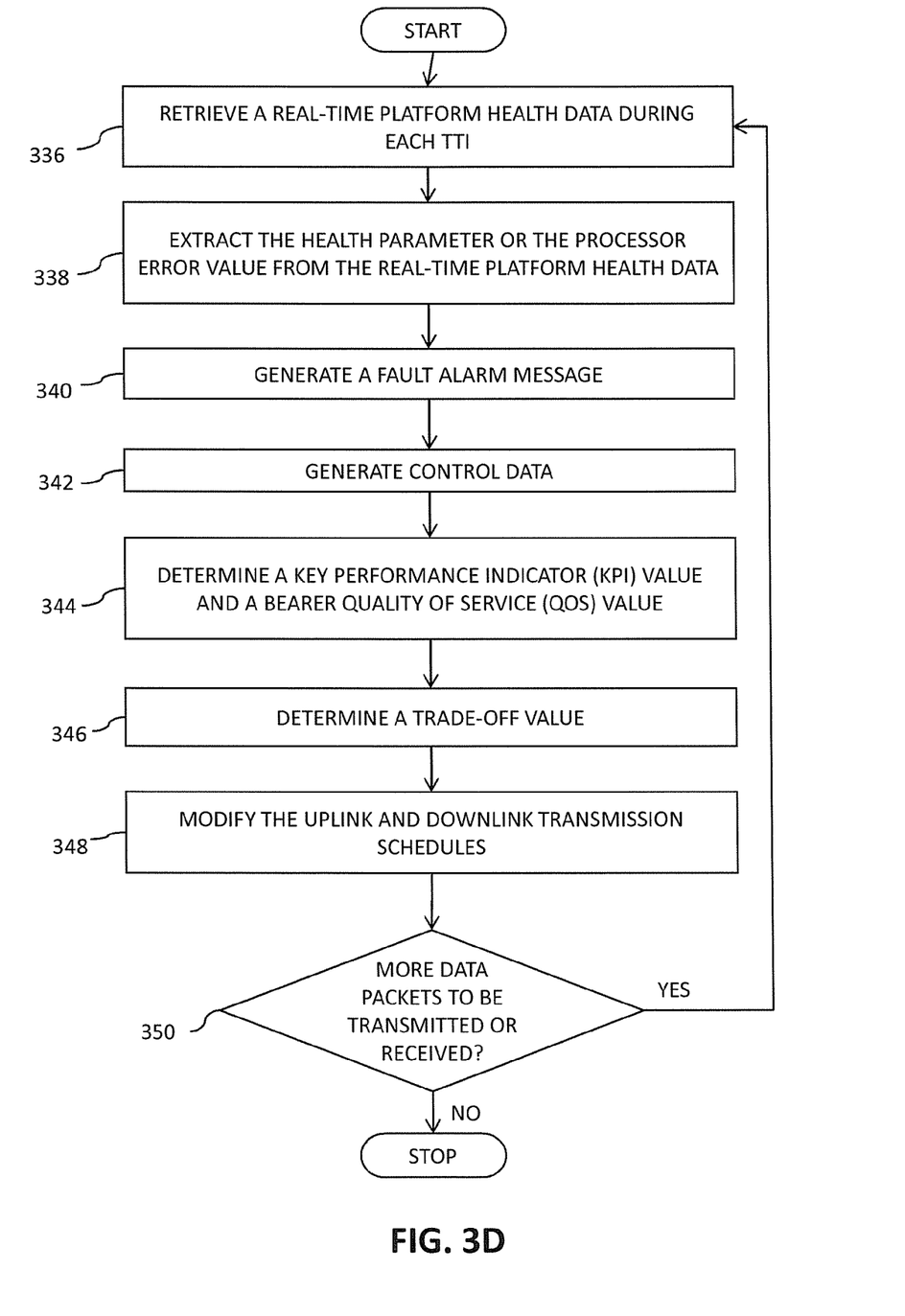

At step 336, the real-time platform health processing agent 226 retrieves the real-time platform health data 238 from the shared memory 222 during each TTI. At step 338, the real-time platform health processing agent 226 extracts at least one of the health parameter and the processor error value from the real-time platform health data 238. At step 340, the real-time platform health processing agent 226 generates the fault alarm message based on at least one of the load value and the processor error value. The real-time platform health processing agent 226 generates the fault alarm message when the load value and the processor error value exceed the threshold load value and the threshold processor error value. At step 342, the data plane processing module 230 generates the control data for modification of the primary uplink and downlink transmission schedules. At step 344, the scheduler trade-off module 234 determines the KPI value and the air interface scheduler 236 determines the bearer QoS value of the UEs being serviced by the eNodeB. At step 346, the scheduler trade-off module 234 determines the trade-off value based on the fault alarm message and the KPI value. At step 348, the air interface scheduler 236 modifies at least one of the primary uplink and downlink transmission schedules based on the trade-off value, the bearer QoS value, and the control data. Subsequently, the modified uplink and downlink transmission schedules are provided to the L1 processing agent 242 by way of the shared memory 222. At step 350, the second processor 222 checks to determine if any more data packets are to be transmitted or received. If at step 350, the second processor 222 determines that more data packets are to be transmitted or received, step 336 is executed.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for scheduling transmission in uplink and downlink communication channels of a wireless communication network the system comprising:
   a first processor configured for:
      executing a layer 1 (L1) processing agent,
      receiving a first set of transport blocks based on a downlink transmission schedule,
      processing the first set of transport blocks,
      generating a first set of in-phase and quadrature-phase (I/Q) samples,
      transmitting the first set of I/Q samples over the downlink communication channel based on the downlink transmission schedule,
      receiving a second set of I/Q samples via the uplink communication channel based on an uplink transmission schedule,
      processing the second set of I/Q samples,
      generating a second set of transport blocks,
      determining a health parameter associated with the first processor, and
      generating real-time platform health data based on the health parameter;
   a shared memory connected to the first processor for receiving and storing the real-time platform health data and modified uplink and downlink transmission schedules; and
   a second processor connected to the shared memory for executing a real-time platform health processing agent and a layer 2 (L2) processing agent, wherein the real-time platform health processing agent receives the real-time platform health data and generates a fault alarm message, and wherein the L2 processing agent includes:
      a data plane processing module for L2 processing of a wireless protocol stack, wherein the data plane processing module:
         reads a first set of data packets from a system memory,
         processes the first set of data packets and generates the first set of transport blocks,
         reads the second set of transport blocks generated by the first processor from the shared memory,
         processes the second set of transport blocks,
         generates a second set of data packets, and
         generates control data corresponding to at least one of the uplink and downlink communication channels; and
      a scheduling module for receiving the control data and the fault alarm message, wherein the scheduling module:
         determines a key performance indicator (KPI) value and a bearer quality of service (QoS) value, determines a trade-off value based on the fault alarm message and the KPI value,
modifies at least one of the uplink and downlink transmission schedules based on the trade-off value, the bearer QoS value, and the control data, and
generates and provides the at least one of the modified uplink and downlink transmission schedules to the first processor via the shared memory,
wherein the first processor receives the at least one of the modified uplink and downlink transmission schedules, and
receives and/or transmits a third set of I/Q samples over the uplink and downlink communication channels based on the modified uplink and downlink transmission schedules, respectively, and
wherein the KPI value of at least one of the uplink and downlink communication channels is modified based on the real-time platform health data.

2. The system of claim 1, wherein the first processor is further configured for:
receiving a third set of transport blocks from the second processor via the shared memory based on the modified downlink transmission schedule and generating the third set of I/Q samples,
transmitting the third set of I/Q samples over the downlink communication channel based on the modified downlink transmission schedule,
receiving a fourth set of I/Q samples via the uplink communication channel based on the modified uplink transmission schedule, and
processing the fourth set of I/Q samples and generating a fourth set of transport blocks.

3. The system of claim 2, further comprising:
a radio-frequency integrated circuit (RFIC) for receiving the first and third sets of I/Q samples and generating first and second analog output signals, respectively, and receiving first and second analog input signals and generating the second and fourth sets of I/Q samples, respectively;
a power amplifier connected to the RFIC for receiving the first and second analog output signals and generating first and second amplified analog output signals; and
an antenna connected to the power amplifier and the RFIC for transmitting the first and second amplified analog output signals over the downlink communication channel and receiving the first and second analog input signals via the uplink communication channel.

4. The system of claim 3, further comprising a hardware accelerator connected to the first processor for:
executing a pre-defined set of instructions,
identifying a processing error associated with the pre-defined set of instructions and generating a processor error value,
wherein the processor error value is stored as the real-time platform health data in the shared memory, and
wherein the KPI value of at least one of the uplink and downlink communication channels is modified based on the processing error value.

5. The system of claim 4, wherein the hardware accelerator is included in at least one of a L1 sub-system and a L2 sub-system, and wherein the L1 sub-system is included in a baseband unit of an eNodeB and includes the first processor, and wherein the L2 sub-system is included in the baseband unit of the eNodeB and includes the second processor.

6. The system of claim 3, wherein the first processor is further configured for receiving a processor error value associated with a processing error of a pre-defined set of instructions executed by a hardware accelerator and stores at least one of the health parameter and the processor error value as the real-time platform health data in the shared memory during each transmission time interval (TTI).

7. The system of claim 1, wherein the KPI value is indicative of at least one of a throughput value of the uplink and downlink communication channels, number of users in the wireless communication network, number of bearers in the uplink and downlink communication channels, and scheduling delay.

8. The system of claim 7, wherein the second processor retrieves the real-time platform health data from the shared memory during each transmission time interval (TTI).

9. The system of claim 8, wherein the real-time platform health processing agent extracts at least one of the health parameter and a processor error value from the real-time platform health data and generates the fault alarm message when at least one of the health parameter and the processor error value exceeds a predetermined threshold health parameter and a predetermined threshold processor error value, respectively.

10. The system of claim 9, wherein the scheduling module generates the modified uplink and downlink transmission schedules based on the trade-off value, the bearer QoS value, and the control data by allocating a first set of resource blocks of a plurality of resource blocks for the transmission of the third set of I/Q samples over the downlink communication channel and a second set of resource blocks of the plurality of resource blocks for receiving the fourth set of I/Q samples via the uplink communication channel.

11. The system of claim 1, wherein the system is included in an eNodeB and the bearer (QoS) value corresponds to user equipment (UEs) that are serviced by the eNodeB, and wherein the first set of data packets are received at the eNodeB from a packet switched IP network and stored in the system memory.

12. A method for modifying a key parameter indicator (KPI) value of uplink and downlink communication channels of a wireless communication network, wherein the KPI value is indicative of at least one of a throughput value of the uplink and downlink communication channels, count of users in the wireless communication network, count of bearers in the uplink and downlink communication channels, and scheduling delay, the method comprising:
receiving a first set of data packets from a system memory;
processing the first set of data packets and generating a first set of transport blocks;
processing the first set of transport blocks and generating a first set of in-phase and quadrature-phase (I/Q) samples;
transmitting the first set of I/Q samples by way of the downlink communication channel based on a downlink transmission schedule;
receiving a second set of I/Q samples by way of the uplink communication channel based on an uplink transmission schedule;
processing the second set of I/Q samples and generating a second set of transport blocks;
receiving the second set of transport blocks and processing the second set of transport blocks for generating a second set of data packets;
determining a health parameter associated with the uplink and downlink communication channels;
generating real-time platform health data based on the health parameter;

storing the real-time platform health data in a shared memory;

generating a fault alarm message based on the real-time platform health data;

generating control data for modification of the uplink and downlink transmission schedules;

determining the KPI value and a bearer quality of service (QoS) value;

determining a trade-off value based on the fault alarm message and the KPI value;

modifying at least one of the uplink and downlink transmission schedules based on the trade-off value, the bearer QoS value, and the control data; and transmitting and receiving third and fourth sets of I/Q samples by way of the uplink and downlink communication channels based on the modified uplink and downlink transmission schedules, respectively, whereby the KPI value of at least one of the uplink and downlink communication channels is modified based on the real-time platform health data.

13. The method of claim 12, further comprising:

storing the health parameter as the real-time platform health data in the shared memory during each transmission time interval (TTI), wherein one TTI corresponds to the time required for transmitting one sub-frame by way of the downlink communication channel; and retrieving the real-time platform health data from the shared memory during each TTI.

14. The method of claim 13, further comprising:

executing a pre-defined set of instructions for processing the first, second, third, and fourth sets of I/Q samples;

identifying a processing error during execution of the pre-defined set of instructions;

generating a processor error value associated with the processing error; and storing the processor error value as the real-time platform health data in the shared memory during each TTI.

15. The method of claim 14, further comprising:

extracting at least one of the health parameter and the processor error value from the real-time platform health data; and generating the fault alarm message when at least one of the health parameter and the processor error value exceeds a predetermined threshold health parameter and a predetermined threshold processor error value, respectively.

16. The method of claim 15, further comprising:

allocating a first set of resource blocks of a plurality of resource blocks for the transmission of the third set of I/Q samples by way of the downlink communication channel;

generating the modified downlink transmission schedule based on the first set of resource blocks;

allocating a second set of resource blocks of the plurality of resource blocks for receiving the fourth set of I/Q samples by way of the uplink communication channel; and generating the modified uplink transmission schedule based on the second set of resource blocks.

17. A baseband unit connected to a system memory that stores a plurality of output data packets in a wireless communication system, the baseband unit comprising:

a shared memory for storing a real-time platform health data and modified uplink and downlink transmission schedules; and a processor connected to the system and shared memories, for executing a real-time platform health processing agent and a layer 2 (L2) processing agent, wherein the real-time platform health processing agent receives the real-time platform health data and generates a fault alarm message, and wherein the L2 processing agent includes:

a data plane processing module for L2 processing of a wireless protocol stack, receiving the plurality of output data packets, processing the plurality of output data packets for generating a plurality of output transport blocks, and generating control data corresponding to at least one of the uplink and downlink communication channels; and a scheduling module for generating an uplink transmission schedule that is utilized for receiving a plurality of input transport blocks and a downlink transmission schedule that is utilized for transmitting the plurality of output transport blocks, receiving the control data and the fault alarm message, determining a key performance indicator (KPI) value and a bearer quality of service (QoS) value of the UEs being serviced by the eNodeB, determining a trade-off value based on the fault alarm message and the KPI value, modifying at least one of the uplink and downlink transmission schedules based on the trade-off value, the bearer QoS value, and the control data, generating the modified uplink and downlink transmission schedules, and storing the modified uplink and downlink transmission schedules in the shared memory, wherein the KPI value of at least one of the uplink and downlink communication channels is modified based on the real-time platform health data, and wherein the KPI value is indicative of at least one of a throughput value of the uplink and downlink communication channels, count of users in the wireless communication network, count of bearers in the uplink and downlink communication channels, and scheduling delay.

18. The baseband unit of claim 17, wherein a health parameter of at least one of a digital signal processor, a hardware accelerator, and a direct memory access (DMA) system of the wireless communication system is stored as the real-time platform health data during each transmission time interval (TTI), and wherein one TTI corresponds to the time required for transmitting one sub-frame by way of the downlink communication channel.

19. The baseband unit of claim 18, wherein the real-time platform health processing agent receives the real-time platform health data from the shared memory during each TTI, extracts the health parameter from the real-time platform health data, and generates the fault alarm message when the health parameter exceeds a predetermined threshold health parameter.

20. The baseband unit of claim 19, wherein the scheduling module generates at least one of the modified uplink and downlink transmission schedules by allocating a set of resource blocks of a plurality of resource blocks for at least one of the uplink and downlink communication channels.

* * * * *